United States Patent [19]

Hinzpeter et al.

[11] Patent Number: 4,680,158

[45] Date of Patent: Jul. 14, 1987

[54] CIRCULAR PELLETIZING MACHINE AND METHOD OF CONTROLLING THE SAME

[75] Inventors: Jürgen Hinzpeter; Ingo Schmidt, both of Schwarzenbek, Fed. Rep. of Germany

[73] Assignee: Wilhelm Fette GmbH, Schwarzenbek, Fed. Rep. of Germany

[21] Appl. No.: 870,313

[22] Filed: Jun. 3, 1986

[30] Foreign Application Priority Data

Jun. 5, 1985 [DE] Fed. Rep. of Germany ....... 3520203

[51] Int. Cl.⁴ ................ B29B 9/00

[52] U.S. Cl. ................ 264/40.5; 425/149; 425/354

[58] Field of Search ................ 264/40.1, 40.4, 40.5; 364/476; 425/149, 354

[56] References Cited

U.S. PATENT DOCUMENTS 4,373,888 2/1983 Yamamoto ................ 425/149

4,452,579 6/1984 Janson ................ 425/140

*Primary Examiner*—Jan H. Silbaugh

*Assistant Examiner*—Mary Lynn Fertig

*Attorney, Agent, or Firm*—Michael J. Striker

[57] ABSTRACT

A circular pelletizing machine for compressing of powder or grain materials, comprises a rotatable matrix disc with a plurality of circumferentially distributed matrices, upper and lower punches located above and below the matrix disc respectively, at least two pre-pressing elements movable relative to one another and acting upon the upper and lower stamps so as to pre-press pellets of a material, at least two main pressing elements movable relative to one another and acting upon the upper and lower stamps so as to finally press the pellets of the material, an adjusting motor arranged to adjust a distance between the main pressing elements relative to one another, computer device arranged to control the adjusting motor, and device for measuring a pressing force of the pre-pressing elements and supplying data of the measurement to the computer device so that the computer device controls the adjusting motor and therefore the distance between the main pressing elements in dependence upon the measured pressing force of the pre-pressing elements. A method is also proposed for controlling the circular pelletizing machine respectively.

7 Claims, 4 Drawing Figures

CIRCULAR PELLETIZING MACHINE AND METHOD OF CONTROLLING THE SAME

BACKGROUND OF THE INVENTION

The present invention relates to a circular pelletizing machine and a method of controlling the same.

More particularly, the present invention deals with a circular pelletizing machine for compressing a powder or grain material, which has a rotatable matrix disc with a plurality of circumferentially distributed matrices as well as upper and lower stamps associated with the matrix disc. Pre-pressing rollers and main-pressing rollers act on the upper and lower stamps to pre-press and to finally press the material. In this machine the main pressing rollers is adjusted by an adjusting motor which is controlled by a computer.

Circular pelletizing machines of the above mentioned general type are known in the art. They are used for manufacturing of pressed (stamped) articles of different materials. The use of such machines is not limited only to the manufacture of pellets from medical substances to be administered to patients, but also these machines are used for producing articles of synthetic plastic materials, metal powder or ceramic masses. The individual pellets are produced by compressing the powdered mass in a matrix on a rotatable matrix disc in the upper and lower stamps. The force of compression of the material in the main pressing station is obtained by displacement of the upper and lower stamps under the action of main pressing rollers, and the distance between the latter is adjusted by an adjusting motor, for obtaining the required main pressing force. The above described machine and method of its controlling is disclosed in the German patent document DT-OS No. 3,131,402.

In modern high efficiency pelletizing machines, a pre-compression of the material in a pre-pressing station is performed under the action of the pre-pressing force. This pre-pressing force is as a rule considerably lower than the main pressing force. For example, the pre-pressing force amounts to approximately 10 kN, and the main pressing force amounts to approximately 40 kN. In many cases the manufacture of pellets requires such high pressing forces that they lie very close to the permissible load limits of the stamps for pressing. In the event of operational disturbances for example double filling, the limit of the permissible load of a main pressing stamp can be exceeded, and this can lead to a crushing or a breakage of the stamp. For preventing this, it is known to provide hydraulic or spring safety devices. These devices possess however the decisive disadvantage that they are relatively slow since the masses to be moved are high. Therefore, in fast and high-efficiency machines, a sufficient displacement of the main pressing rollers within short time is not possible, since the time required for producing the signal of the main pressing force and moving the frame system of the main pressing rollers amounts to several milliseconds in the event of high pellet output. Because of the above reasons, in the pelletizing machines with high outputs a stamp breakage is not excluded, despite the safety means provided in them.

SUMMARY OF THE INVENTION

Accordingly, it is an object of the present invention to provide a circular pelletizing machine and a method of controlling the same, which avoids the disadvantages of the prior art.

More particularly, it is an object of the present invention to provide the above machine and method in which the danger of stamp breakages in a main pressing station is considerably reduced.

In keeping with these objects and with others which will become apparent hereinafter, one feature of the present invention resides, briefly stated, in that a computer for controlling an adjusting motor which changes the distance between main pressing rollers controls the adjusting motor in dependence upon a pressing force which is measured at prepressing rollers. The pre-pressing force of each stamp in the pre-pressing station is measured and evaluated. When this pre-pressing force is considerably lower than the main pressing force at the main pressing station, its value can lead to a conclusion about the value of main pressing force to be expected. Therefore, the value of the pre-pressing force allows to recognize whether the pressing force at the main pressing station will exceed the permissible stamp load.

In accordance with the present invention, a limit for the pre-pressing force is provided, and when the maximum pre-pressing force exceeds this limit, the press is stopped momentarily so that the pellet which has been pre-pressed by the associated stamps does not reach the main pressing station. Simultaneously, or after the stoppage of the matrix disc, the main pressing rollers automatically move away from one another by a predetermined distance so that the stamps in the event of excessively high pre-pressing force are controlled by a computer without excessively high main pressing force and without the danger of damage between the main pressing rollers moving away from one another. After this, the pelletizing machine is again stopped for avoiding an output of the too many bad pellets which would take place during the time of return movement of the main pressing rollers to the initially predetermined distance. When this return movement is performed, the manufacture of the pellets progresses automatically.

The main pressing rollers are supported for example in supports, and the adjusting motor adjusts the distance between the supports. The adjusting motor is coupled with a longitudinally displaceable rod for driving the latter. The rod is connected with the supports of the main pressing rollers and therefore the main pressing rollers can be supported in a paralellogram-shaped pressing frame.

The control of the adjusting motor for the main pressing rollers and of the driving motor for the rotation of the matrix disc is performed, for example, with the use of a microprocessor which is connected with wire strain gauges for measuring the pre-pressing forces of the pre-pressing rollers in a known manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A circular pelletizing machine in accordance with the present invention has a matrix disc 1 which rotates in the direction of arrow 7 and is provided with matrices 2 which are uniformly distributed over the circumference.

Figure 1:
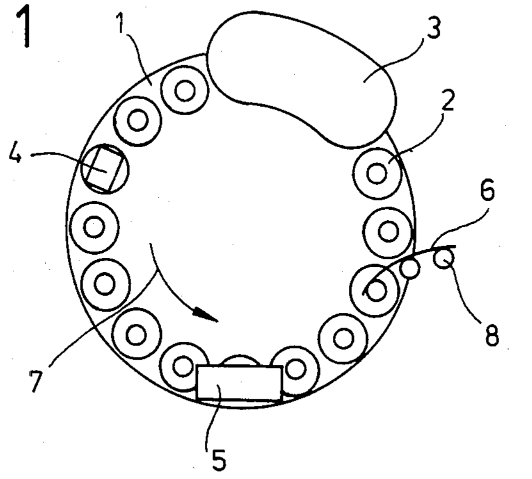
FIG. 1 is a schematic plan view of a circular pelletizing machine in accordance with the present invention.
Figure 2:
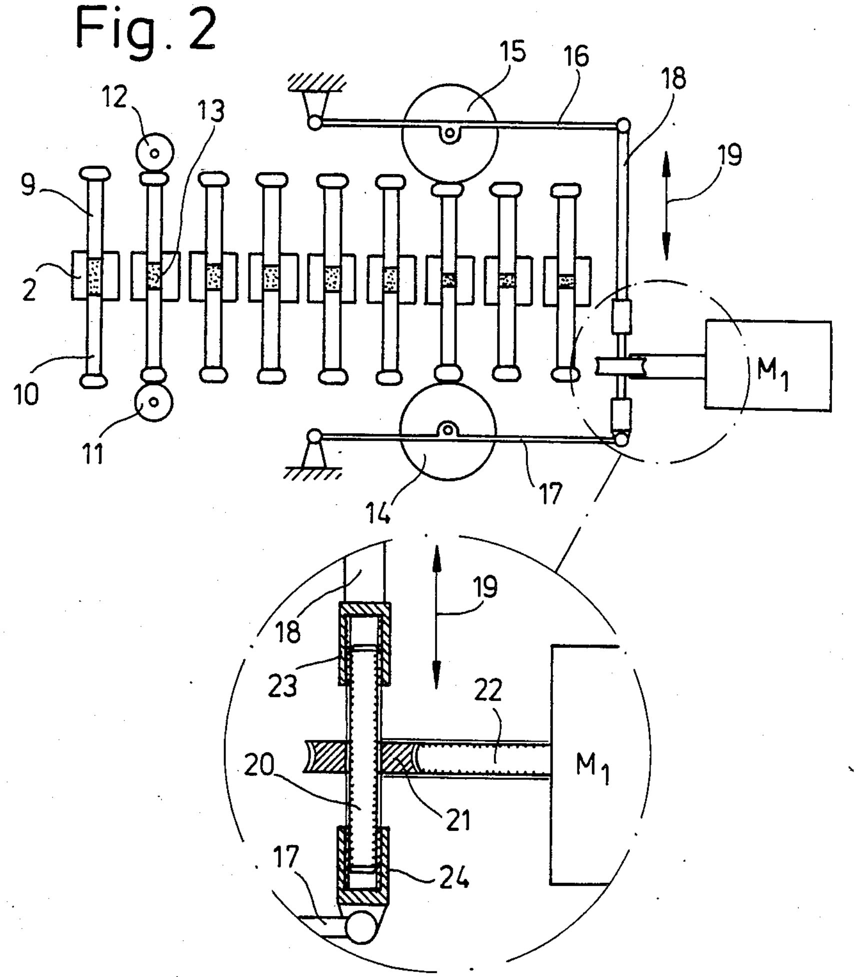
FIG. 2 is a view schematically showing a pre-pressing station and a main pressing station of the inventive circular pelletizing machine, on an enlarged scale.

For producing of pellets the matrices 2 are filled with a material to be pressed in a filling station 3. The material is pre-pressed in a pre-pressing station 4 with the use of pre-pressing rollers 11 and 12 as shown in FIG. 2. The pre-pressing rollers 11 and 12 act upon an upper punch 9 and a lower punch 10 associated with each matrix, for pre-pressing a pellet 8.

After the pre-pressing in the pre-pressing station, a final compression of the pressing material 13 in a main pressing station 5 is performed with the use of main pressing rollers 14 and 15. The main pressing rollers 14 and 15 are supported in a pressing frame shown in FIG. 2. The pressing frame includes two supports 16 and 17 which are connected with one another by a rod 18. It is believed to be understood that there is a possibility of supporting the pressing rollers 14 and 15 in a different manner. What is important is that the distance between the pressing rollers 14 and 15 is adjustable by an adjusting motor $M_1$ which is provided with a transmission.

The adjusting motor $M_1$ acts upon a spindle 22 which engages with a worm wheel 21. The worm wheel 21 is seated on a threaded spindle 20 which is supported with its end portions in threaded sleeves 23 and 24.

During running of the spindle 22, the worm wheel 21 and thereby the spindle 20 rotate. Depending on the rotary direction of the spindle 20, both end portions of the rod 18 move in the direction of the double arrow 18 toward one another or away of one another, so that the distance between the main pressing rollers 14 and 15 is adjusted.

Figure 3:
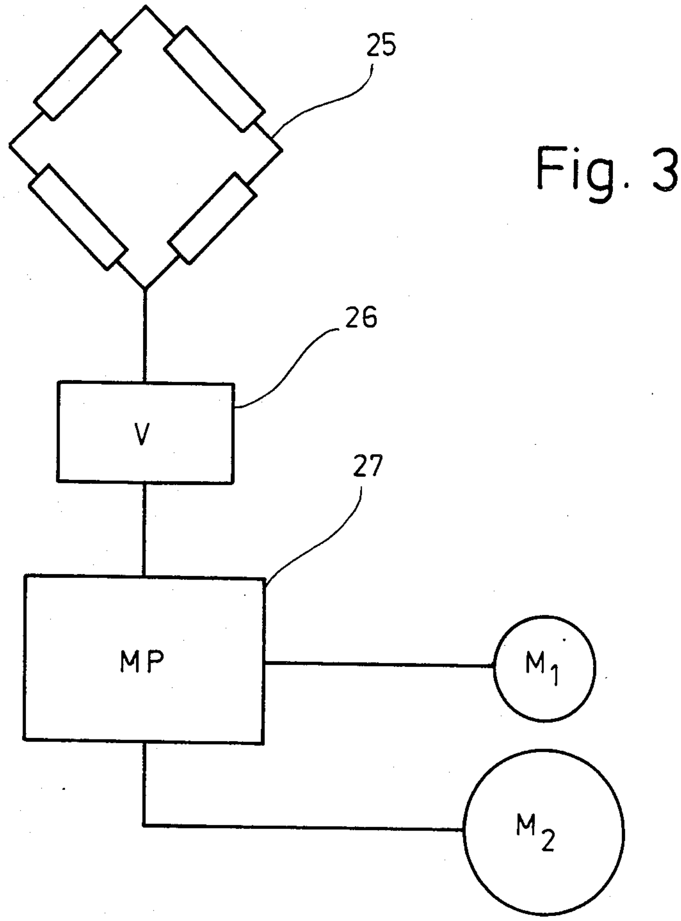
FIG. 3 is a view showing a circuitry for controlling of the motors of the inventive machine.

The pre-pressing rollers 11 and 12 are supported by a support in a known manner which is not shown in the drawing. The support is provided with wire strain gauges which measure the bending of the support in dependence upon the pre-pressing force of the pre-pressing rollers 11 and 12 of the stamps 9 and 10. The results of the measurements are converted into voltage signals which are proportional to the pre-pressing pressure. The wire strain gauges are connected with one another in accordance with the principle of full bridge or a Wheatstone bridge as shown in FIG. 3. The voltage change which take place in the wire strain gauges or the bridge 25 during pressing is amplified by an amplifier 26 and supplied to a microprocessor 27. The microprocessor 27 performs an evaluation of the signal under consideration of the predetermined pressing force limits. When the pressing force exceed a pre-pressing force limit, a signal is supplied to the adjusting motor $M_1$ for displacement of the main pressing rollers 14 and 15, and also to the main drain motor $M_2$ of the matrix disc 1 for stopping its rotation.

Figure 4:
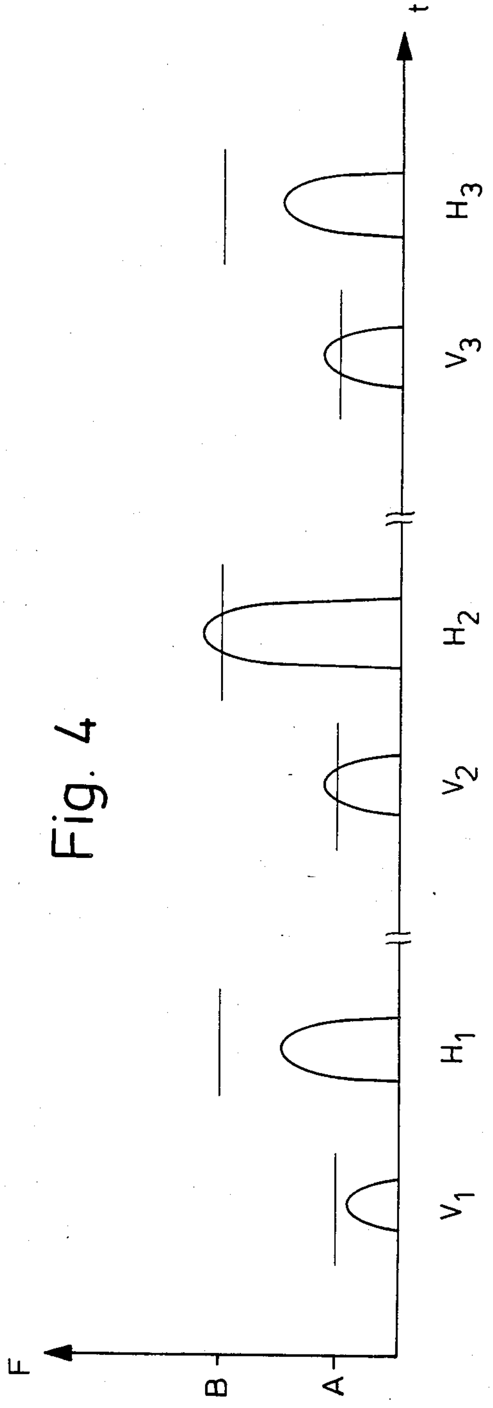
FIG. 4 is a diagram showing pressing forces in the inventive circular pelletizing machine.

FIG. 4 shows the values F of the pressing force versus the time in three different operational conditions.

The pre-pressing force V is normally smaller than the main pressing force H. In operation, it is prevented that the main pressing force H exceeds a predetermined pressing force value B since otherwise there will arise the danger of a stamp breakage. For this purpose the value of the pre-pressing force V is considered. If the pre-pressing force $V_1$ is lower than a predetermined pre-pressing force value A, it can be determined that the subsequent main pressing force $H_{11}$ lies also below the tolerance limit B. If the pre-pressing force $V_2$ exceeds the predetermined limit A, then it must be considered that the subsequent main pressing force $H_2$ will also exceed the tolerance limit B. For preventing this, in accordance with the present invention, if the pre-pressing force $V_3$ exceeds the adjustable value A, the machine is stopped and the main pressing rollers are moved away of one another, so that subsequently a main pressing force $H_3$ to be measured lies far below the tolerance limit B.

It will be understood that each of the elements described above, or two or more together, may also find a useful application in other types of constructions differing from the types described above.

While the invention has been illustrated and described as embodied in a circular pelletizing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A circular pelletizing machine for compressing of powder or grain materials, comprising a rotatable matrix disc with a plurality of circumferentially distributed matrices; upper and lower punches located above and below said matrix disc respectively; at least two pre-pressing elements movable relative to one another and acting upon said upper and lower stamps so as to pre-press pellets of a material; at least two main pressing elements movable relative to one another and acting upon said upper and lower stamps so as to finally press the pellets of the material; an adjusting motor arranged to adjust a distance between said main pressing elements relative to one another; computer means arranged to control said adjusting motor; and means for measuring a pressing force of said pre-pressing elements and supplying data of the measurement to said computer means so that said computer means controls said adjusting motor and therefore the distance between said main pressing elements in dependence upon the measured pressing force of said pre-pressing elements to avoid application of a pressing force by the main pressing elements above a predetermined limit.

2. A circular pelletizing machine as defined in claim 1; and further comprising a support which supports said pre-pressing elements, said measuring means being arranged on said support.

3. A circular pelletizing machine as defined in claim 2, wherein said measuring means includes a measuring pick-up which is arranged on said support and connected with said adjusting motor of said main pressing elements via said computer means.

4. A method of controlling a circular pelletizing machine in which the material to be pressed is accommodated in matrices of a matrix disc, pre-pressed by upper and lower stamps under the action of pre-pressing elements, and then finally pressed by the upper and lower stamps under the action of main pressing elements, the method comprising the steps of adjusting a distance between the main pressing elements by an adjusting motor which is controlled by computer means; measuring a pressing force on the pre-pressing elements; and supplying data of the measurement to the computer means so that the computer means control the adjusting motor and thereby the distance between the main pressing elements in dependence upon the measured pressing force of the pre-pressing elements to avoid application of a pressing force by the main pressing elements above a predetermined limit.

5. A method as defined in claim 4; and further comprising the steps of interrupting a rotation of the matrix disc when the measured pre-pressing force exceeds a predetermined value; increasing the distance between the main pressing elements before an advancement of a pre-pressed pellet; and decreasing the distance between the main pressing elements after the advancement of the pellet.

6. A method as defined in claim 5; and further comprising the step of stopping the rotation of the matrix disc after the advancement through the pre-pressing elements of a pellet which has been pre-pressed too much, before the main pressing elements.

7. A method as defined in claim 4; and further comprising the steps of controlling by the computer means of a drive motor which rotates the matrix disc and of the adjusting motor which displaces the main pressing elements, in the event when the pre-pressing force measured by the measuring means exceeds a predetermined value.

* * * * *